(12) United States Patent
Asari et al.

(10) Patent No.: US 6,569,371 B1
(45) Date of Patent: May 27, 2003

(54) METHOD FOR FORMING A COMPOUND MATERIAL

(75) Inventors: Kazumi Asari, Tokyo (JP); Katsuhiko Umeda, Kodaira (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/533,977

(22) Filed: Mar. 23, 2000

(30) Foreign Application Priority Data

Mar. 25, 1999 (JP) .......................................... 11-082053

(51) Int. Cl.⁷ .............................................. B29C 70/56
(52) U.S. Cl. ...................... 264/231; 264/257; 264/258; 264/280; 264/288.4; 264/288.8; 264/324; 264/DIG. 73; 156/229
(58) Field of Search ................................ 264/231, 258, 264/257, 324, 288.4, 288.8, 289.3, 290.6, 291, 290.2, DIG. 73; 156/161, 229

(56) References Cited

U.S. PATENT DOCUMENTS

| 5,043,128 A |   | 8/1991 | Umeda ........................ 264/258 |
| 5,096,645 A | * | 3/1992 | Fink ............................ 264/137 |
| 5,132,070 A | * | 7/1992 | Paul et al. .................... 264/258 |
| 5,721,036 A |   | 2/1998 | Tingley ........................ 428/96 |
| 5,908,596 A | * | 6/1999 | Wilkins et al. ............... 264/257 |

| 6,296,804 B1 | * | 10/2001 | Chapman et al. ........... 264/565 |

FOREIGN PATENT DOCUMENTS

| JP | 64-004315 | 1/1989 |
| JP | 01-310936 | 12/1989 |
| JP | 02-038026 | 2/1990 |
| JP | 02-102029 | 4/1990 |

* cited by examiner

*Primary Examiner*—Stefan Staicovici
(74) *Attorney, Agent, or Firm*—Armstrong, Westerman & Hattori, LLP (57) ABSTRACT

A method for forming a compound material by intermittently heating and pressurizing a composite material reinforced by fibers. The method is made up of a pinching step of pinching and fixing the upstream end and the downstream end of the composite material; a heating/pressurizing step of heating and pressurizing the pinched and fixed composite material intermittently; and a moving step of releasing the compound material and sending the material to the downstream direction after termination of the heating/pressurizing step; during the pinching step, tension toward the downstream advancing direction is provided to the downstream end of the composite material, and during the moving step, the amount of movement of the compound material at the downstream side is set to be greater than the amount of movement of the compound material at the upstream side, thereby straightening the fibers in the compound material linearly.

3 Claims, 10 Drawing Sheets

METHOD FOR FORMING A COMPOUND MATERIAL

FIELD OF THE INVENTION

The present invention relates to forming a compound material using a plastic-system compound material, and especially using a prepreg material and the like.

DESCRIPTION OF THE RELATED ART

A pull-forming method is one example of a method for continuously manufacturing a molded material or a cylindrical material from a composite material. Such forming method generally involves impregnating resin to reinforcing fibers such as carbon fibers or glass fibers, and sending the material through a heatedmold, so as to cure the resin and to continuously produce molded material. Such method is low in cost, but has problems in the strength, the stability, the reliability of the secondary adhesion and the like of the product.

A method solving the above-mentioned drawbacks of the pull-forming method is proposed in Japanese Patent Nos. 1886522 and 1886560 owned by the present applicant.

The materials disclosed in the above patents have the characteristics of adhering completely to other structural materials. Therefore, they may be used advantageously as the structural material of an aircraft.

However, the materials disclosed in the patents had to be improved of their compressive strength, their load/displacement characteristics and the like in order to be used as the compound material utilized as the structural material of an aircraft.

In order to solve these problems, there is a need to improve the deterioration of the compressive strength of the material which is caused by very fine wavy deformation of the fibers placed inside the material as reinforcement members.

In many cases, the compound material utilized as the structural material of an aircraft includes carbon fibers aligned in one direction (unidirectional fiber) as the reinforcement member to improve the strength of the material.

Analysis of the microphotograph of the compound material has proved that the unidirectional carbon fibers are repeatedly displaced perpendicularly to the direction of arrangement of the fibers (wavy deformation).

Figure 9:
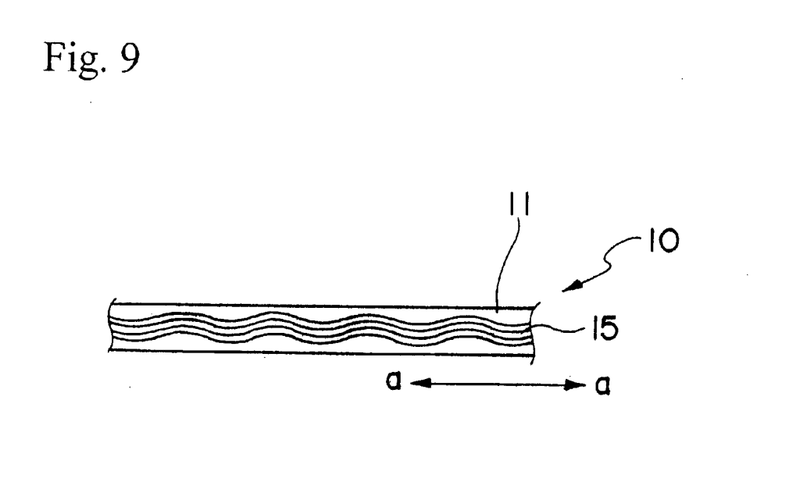
FIG. 9 is an explanatory view showing the compound material of the prior art.

The details of analysis of the compound material 10 will now be explained with reference to FIG. 9.

The direction of the compound material 10 is shown by arrow "a". The unidirectional fibers (carbon fibers, glass fibers and the like) 15 positioned inside a plastic material 11 should be arranged parallel to arrow "a", but as shown in the drawing, the fibers 15 are bent in a wavy manner against the arrow "a" direction.

Figure 10:
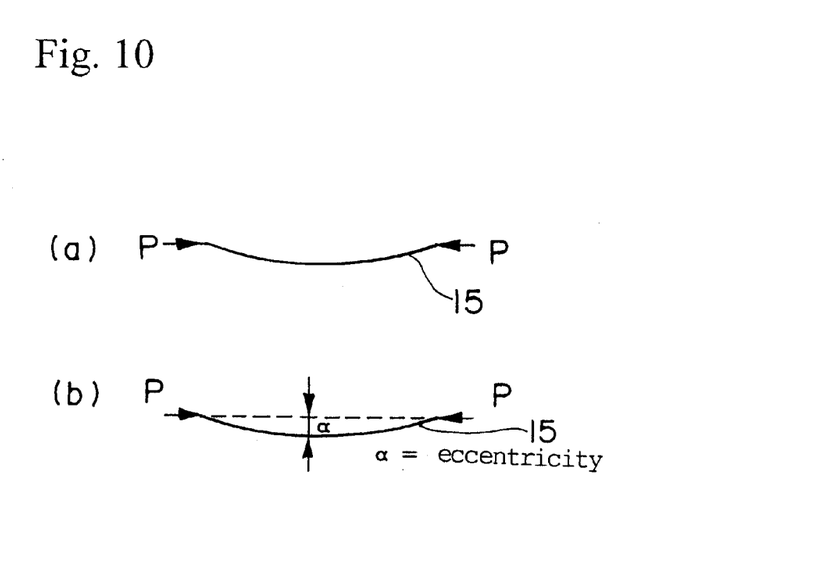
FIG. 10 is an explanatory view showing the fibers in the compound material.

A state is shown in FIG. 10 where the compound material 10 including the wavy-deformed fiber 15 receives compressive strength. When the deformed, decentered fiber 15 receives compressive load P from the direction of the fiber, the fiber will oppose to the load up to a predetermined level, but when the load exceeds the limit of the fiber, the fiber will be buckled (refer to FIG. 10(*a*)).

As shown by FIG. 10(*b*), when further load P is placed, the buckled fiber 15 will be decentered to eccentricity "a" by even a small load.

As explained, the deformed fiber 15 was easily decentered by a small compressive load, and did not exert the expected compressive strength, which was disadvantageous for a structural material.

Figure 11:
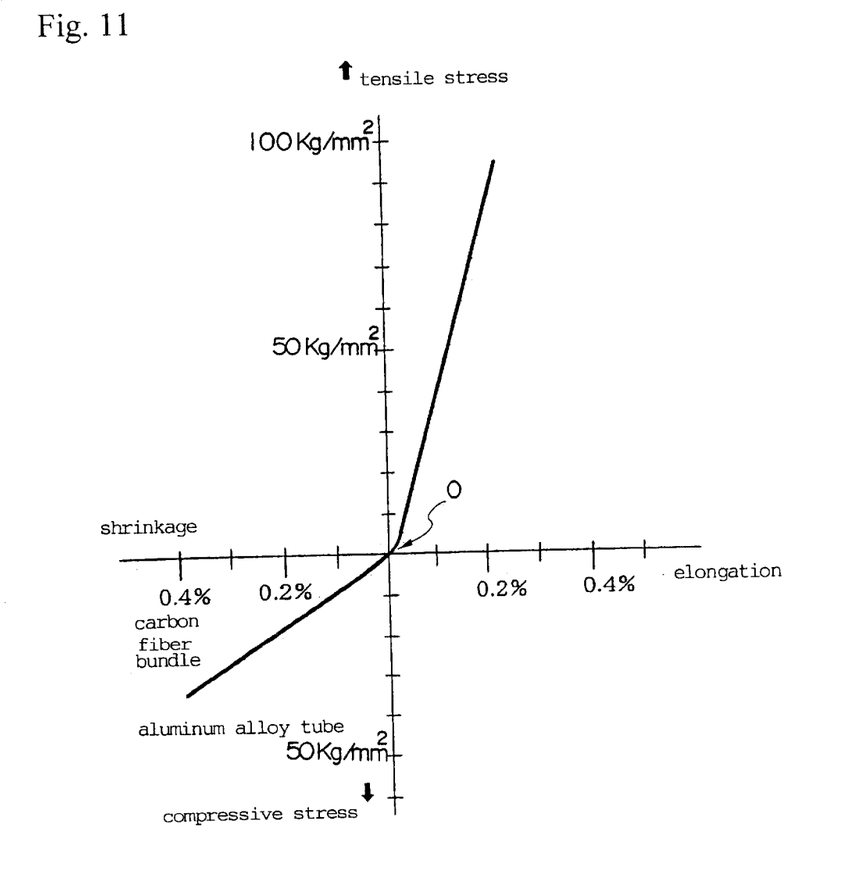
FIG. 11 is a graph showing the relation between the compression force and the extension of the compound material of the prior art.

Moreover, when a decentered fiber exists in the completed structural member, the decentered fiber existing in the resin will be straightened at first when tensile load is provided to the material. After the fiber is straightened, the compound material will show reaction force. The state is shown by a stress/strain diagram (refer to FIG. 11). The relation between the load (compressive stress, tensile stress) and the strain (shrinkage, elongation) is not expressed by a straight line at the initial point 0. In other words, the structural member will not be elongated in proportion to the tensile stress.

As a result, the stress is concentrated to the fibers having a relatively high straightness, and the fiber to which the stress is concentrated may break, which results in the deflection of the material.

The cause of existence of such decentered fiber is that in the prior art forming method where pressurization and depressurization is repeated intermittently, pressure could not be added continuously during the curing of the resin, and the fine waves of the fibers included in the material could not be straightened during the forming process.

The completed material which has gone through the forming process is cooled, and returned to ordinary temperature. At this time, the thermally expanded resin will shrink.

During cooling time, when thermal shrinkage occurs to the structural material with the reinforcement fibers being elongated linearly, the fibers oppose the thermal shrinkage of the resin and maintain a linear state.

For example, the thermal expansion coefficient of an epoxy resin used as the matrix of a structural member is as large as 27 ppm/° C. When the temperature of the product is cooled down from 180° C. to 20° C., the structural material will shrink by 0.4%. On the other hand, the thermal expansion coefficient of the included carbon fibers is as small as 0.3 ppm/° C. (5 ppm/° C. in the case of glass fibers), and the fibers hardly shrink. In other words, during thermal shrinkage, the fibers which are not elongated linearly will be bent even further accompanying the shrinkage of the resin. As a result, as shown in FIG. 9, the fibers acting as the reinforcing member of the structural material are deformed to have continuous wavy bends.

According to calculation, a thermal shrinkage by 0.4% will result in the deformation of fiber having a wavelength of approximately 3 mm and an eccentricity rate of 1.6%, which cannot be ignored.

SUMMARY OF THE INVENTION

The drop in compressive strength of the material caused by the fine wavy deformation of the fiber included in the material as reinforcement member is a problem common to any compound structural material of the prior art. In the studies, such a problem is called micro-buckling, and the method for solving such a problem is required.

The present invention solves the problem by providing a method and device for forming a compound material characterized in that the fibers included in the compound material as reinforcement member are not deformed to have waviness, but instead, arranged linearly within the material.

In order to solve the above-mentioned problem, the present invention provides a method for forming a compound material comprising a pinching step of pinching and fixing the upstream end and the downstream end of a composite material and providing a tension toward the downstream advancing direction to the downstream end of said composite material, a heating/pressurizing step of heating and pressurizing the pinched and fixed composite material intermittently, and a moving step of releasing the compound material and sending said material to the downstream direction after termination of the heating/pressurizing step and setting the amount of movement of said compound material at the downstream side to be greater than the amount of movement of said compound material at the upstream side.

In a further aspect of the method, the tension toward the downstream advancing direction provided to the downstream end of the material is added from before the starting of said heating/pressurizing step to after the termination of said heating/pressurizing step. In another aspect of the method, during said moving step, a tension toward the upstream direction is provided to the upstream side of said compound material.

The device for forming the compound material according to the present invention comprises a pinching means for pinching and fixing the upstream end and the downstream end of a composite material being supplied thereto and further equipped with a tension adding means providing tension toward the downstream direction of movement, and a heating/pressurizing means for heating and pressurizing said composite material being pinched and fixed, wherein a downstream moving means is set so that the amount of said compound material being moved by said downstream moving means is greater than the amount being moved by an upstream moving means, and the tension adding means of the pinching means is started just before said heating/pressurizing means is started.

Even further, the upstream moving means is equipped with a tension adding means for providing tension toward the upstream direction opposite to the advancing direction, the tension toward the downstream direction of said downstream moving means being set to be greater than the tension provided by said tension adding means of the upstream moving means, so that the amount of movement of the composite material by the downstream moving means is greater than the amount of movement of the material by the upstream moving means. In another aspect of the invention, the tension adding means of the pinching means pinching the downstream end of the material providing tension toward the downstream direction starts to operate when said upstream moving means and said downstream moving means stop operating, and said tension adding means stops operating when said pinching means pinching the upstream end and said pinching means pinching the downstream end stop operating. During all molding steps, the fibers in the material are provided with tension so that they are straightened linearly in the material.

DETAILED DESCRIPTION OF PREFERRED EMBODIMENTS

The preferred embodiment of the present invention will now be explained with reference to the accompanied drawings.

Figure 1:
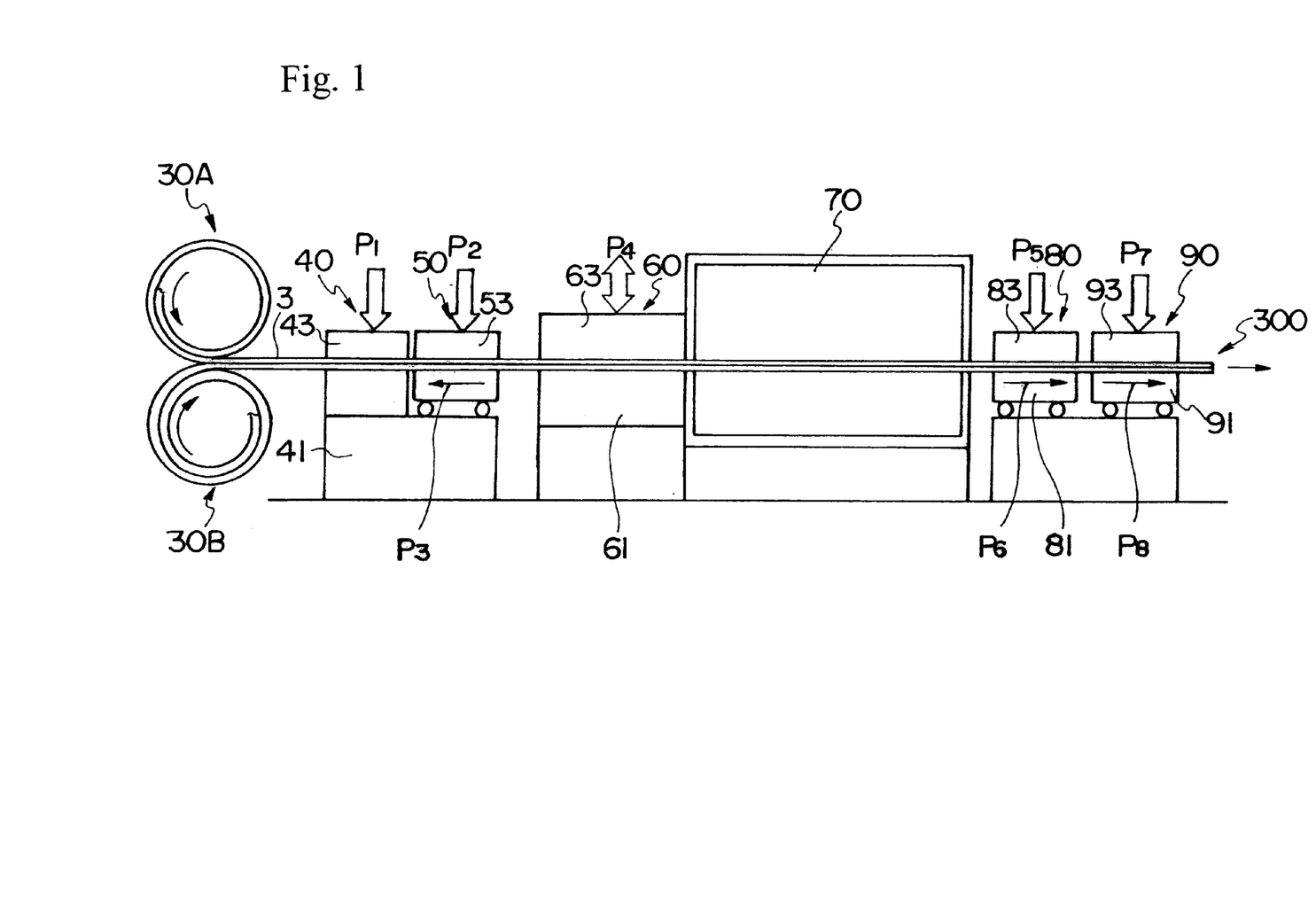
FIG. 1 is an explanatory view showing the whole system of the forming device according to the present invention.
Figure 2:
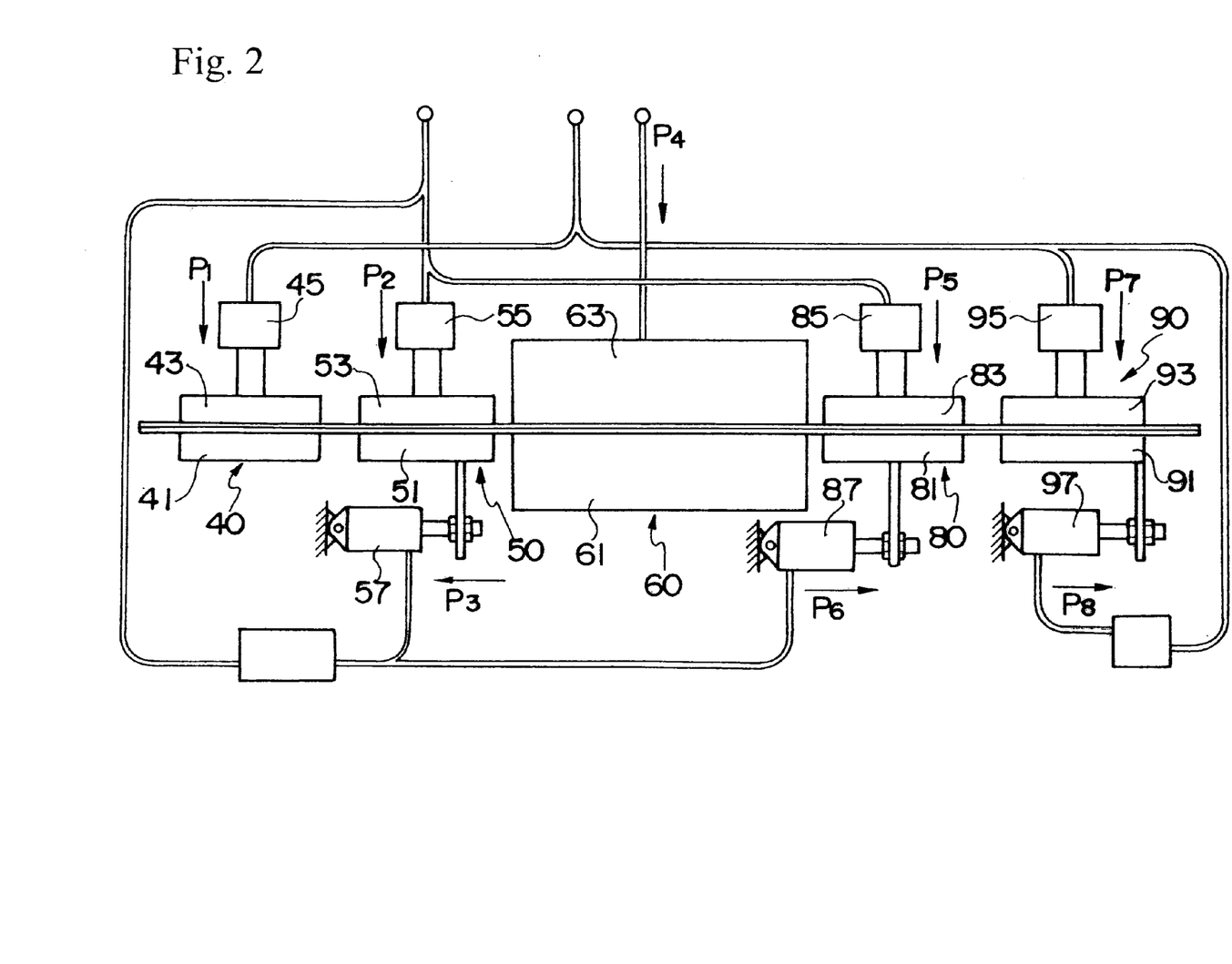
FIG. 2 is a view showing the structural outline of the forming device according to the present invention.

FIGS. 1 and 2 are explanatory views showing the whole device for forming the compound material.

A composite material 3 formed of a prepreg material is supplied from a first supply roll 30A and a second supply roll 30B, and is pinched and supported by an interlocked upstream fixing device 40 and an interlocked downstream fixing device 90. The supplied composite material 3 is moved by an upstream sending device 50 and a downstream sending device 80 which intermittently send the composite material 3 downstream. The composite material 3 is heated and cured by a pressurizer 60 and a heat curing furnace 70, and discharged therefrom as a completed product (compound material) 300.

The upstream fixing device 40 and the downstream fixing device 90 are interlocked with the movement of the composite material 3, and intermittently repeats pinching (supporting) and releasing of the material 3.

The upstream fixing device 40 comprises a fixing unit 41 and a pressurizing unit 43. The pressurizing unit 43 executes the movement (pressurization) toward the fixing unit 41 by a press cylinder 45 which is shown as a move $P_1$ in the direction of the arrow. The downstream fixing device 90 comprises a fixing unit 91 and a pressurizing unit 93. The pressurizing unit 93 executes the movement (pressurization) toward the fixing unit 91 by a press cylinder 95 which is shown as a move $P_7$ in the direction of the arrow. A third tension cylinder 97 is connected to the fixing unit 91, which executes the movement of (provides tension to) the downstream fixing device 90 toward the downstream direction which is shown as a move $P_8$ in the direction of the arrow. As explained, the cured compound material 300 which has passed through the heat curing furnace 70 is pinched and released repeatedly, and at the same time, the compound material 300 is pulled toward the downstream direction when it is being pinched.

The upstream sending device 50 and the downstream sending device 80 are interlocked to repeatedly pinch and release the composite material 3 or the compound material 300, and moves the material toward the advancing direction (downstream) when the material is being pinched.

The upstream sending device 50 comprises a send fixer 51 and a send pressurizer 53. The pressurizer 53 is moved by a press cylinder 55 toward the fixer 51 shown as a move $P_2$ in the direction of the arrow, so as to repeatedly pinch and release the composite material 3. A first tension cylinder 57 is connected to the send fixer 51, so that when the composite material 3 is pinched and moved downstream, the send fixer 51 is moved (adding tension) toward the upstream direction shown as a move $P_3$ in the direction of the arrow.

The downstream sending device 80 is placed downstream from the heat curing furnace 70, and comprises a send fixer 81 and a send pressurizer 83. The pressurizer 83 is moved (pressurized) by a press cylinder 85 toward the fixer 81 shown as a move $P_5$ in the direction of the arrow, so that it repeatedly pinches and releases the compound material 300 which has passed through a heating/pressurizing device 60 and the heat curing furnace 70. A second tension cylinder 87 is connected to the send fixer 81, so that when the compound material 300 is pinched, the send fixer 81 is moved (adding tension) toward the downstream direction shown as a move $P_6$ in the direction of the arrow.

The piston diameter of the second tension cylinder 87 is set larger than the piston diameter of the first tension cylinder 57 in the present forming device. Therefore, when the same hydraulic pressure is added to the first and the second cylinders, the power of the second tension cylinder 87 pulling the downstream sending device 80 toward the downstream direction by movement $P_6$ is larger than the power of the first tension cylinder 57 pulling the upstream sending device 50 toward the upstream direction by the movement $P_3$, and the compound material 300 will be moved toward the downstream direction while receiving tensile power from both ends.

The pressurizing device 60 comprises a fixed pressurizer 61 and a pressurizer 63. The pressurizer 63 performs movement (pressurization) toward the fixed pressurizer 61 shown as movement $P_4$ in the direction of the arrow by a press cylinder not shown, and intermittently repeats the pinching and releasing of the composite material 3.

When the composite material 3 is not moved, the material 3 is pinched by the fixed pressurizer 61 and the pressurizer 63, where it is heated and pressurized. Next, when the pressurizer 63 is moved in a direction opposite to the arrow thereby releasing the composite material 3, the sending devices 50 and 80 move the material. Thereby, the resin heated and cured by the pressurizing device 60 is sent to the heat curing furnace 70, where it is completely cured. The material is then moved by the sending device 80 as a completed compound material 300, and then discharged.

Figure 8:
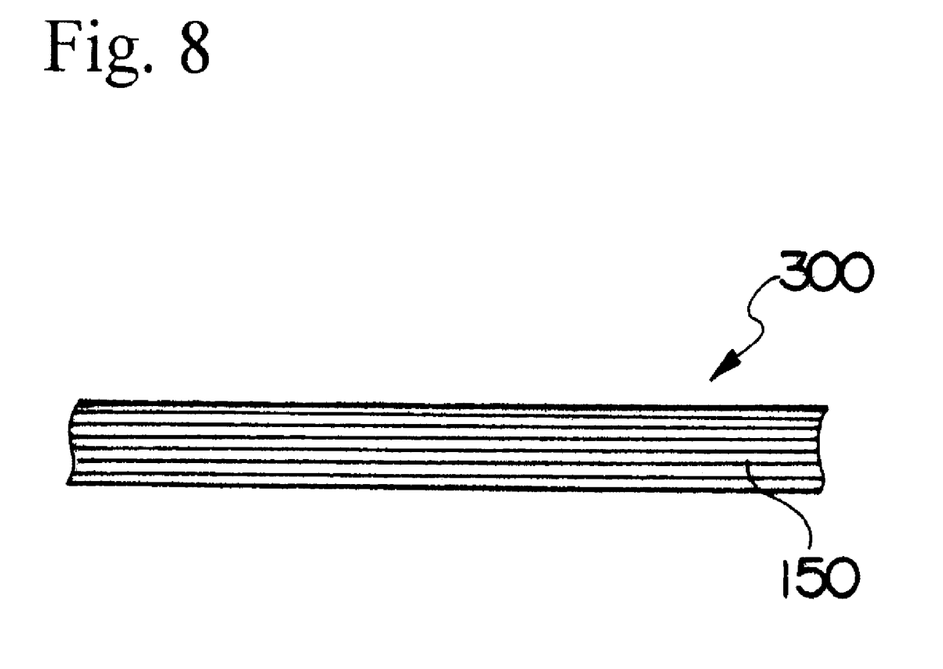
FIG. 8 is an explanatory view of the compound material formed according to the present invention.

The discharged compound material 300 is formed so that fibers 150 are arranged in straight lines, as shown in FIG. 8.

Figure 3:
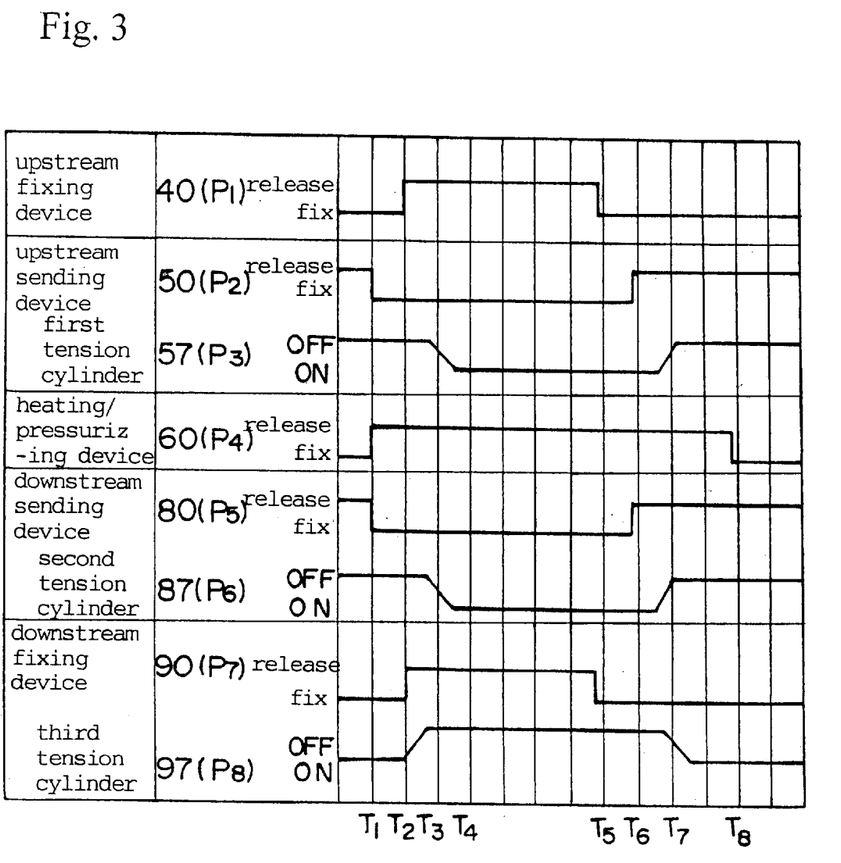
FIG. 3 is a timing chart showing the operation of each device.

Next, the relation between the operation of each device and the movement of the compound material is explained with reference to the timing chart shown in FIG. 3.

Figure 4:
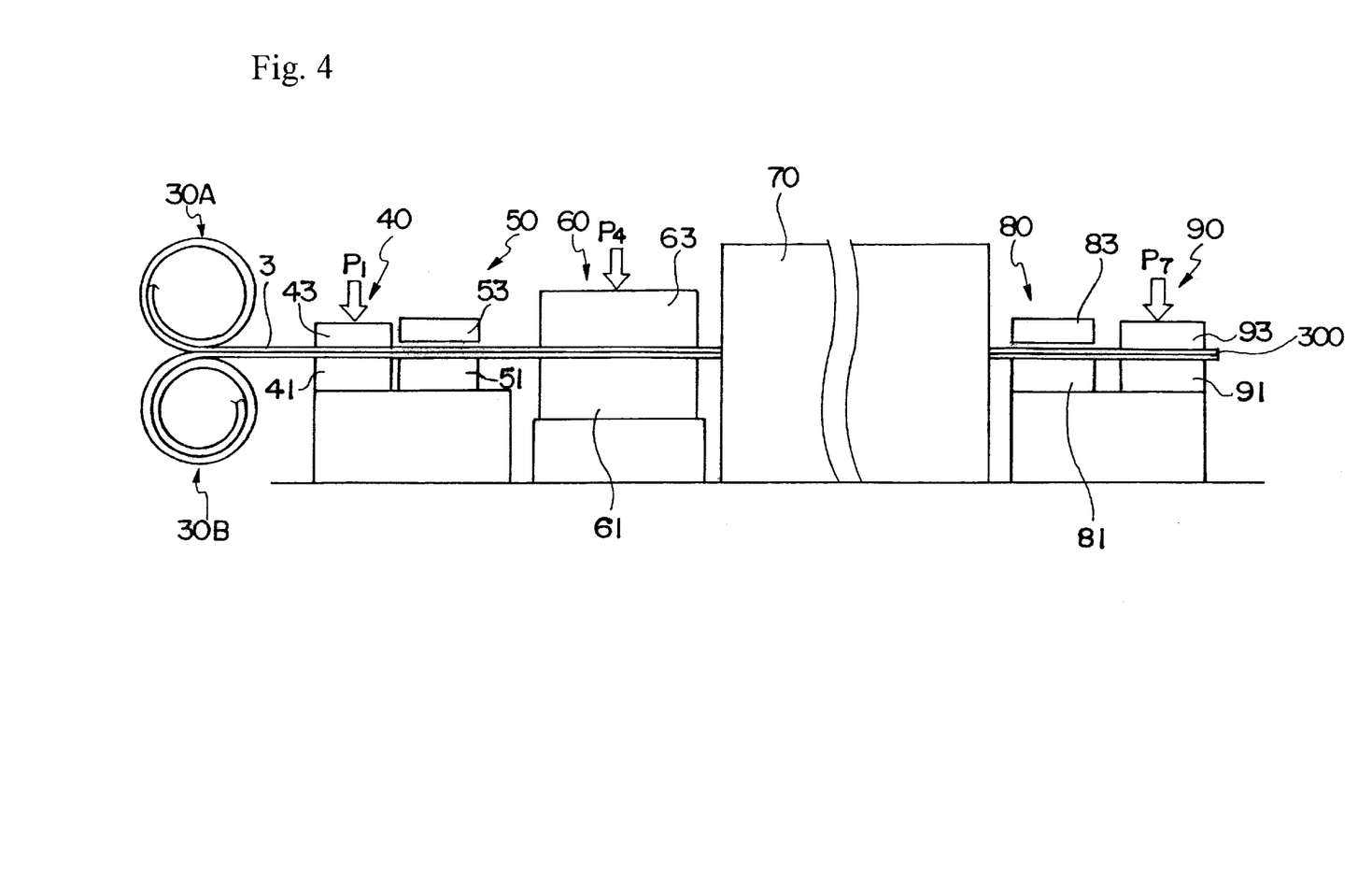
FIG. 4 is an explanatory view showing the state of operation.

Heating/pressurizing step (refer to FIG. 4)

Until time $T_1$, except for the upstream sending device 50 and the downstream sending device 80, all of the upstream fixing device 40, the pressurizing device 60 and the downstream fixing device 90 hold (pinch) the composite material 3 or compound material 300, while heating and pressurizing the same.

Figure 5:
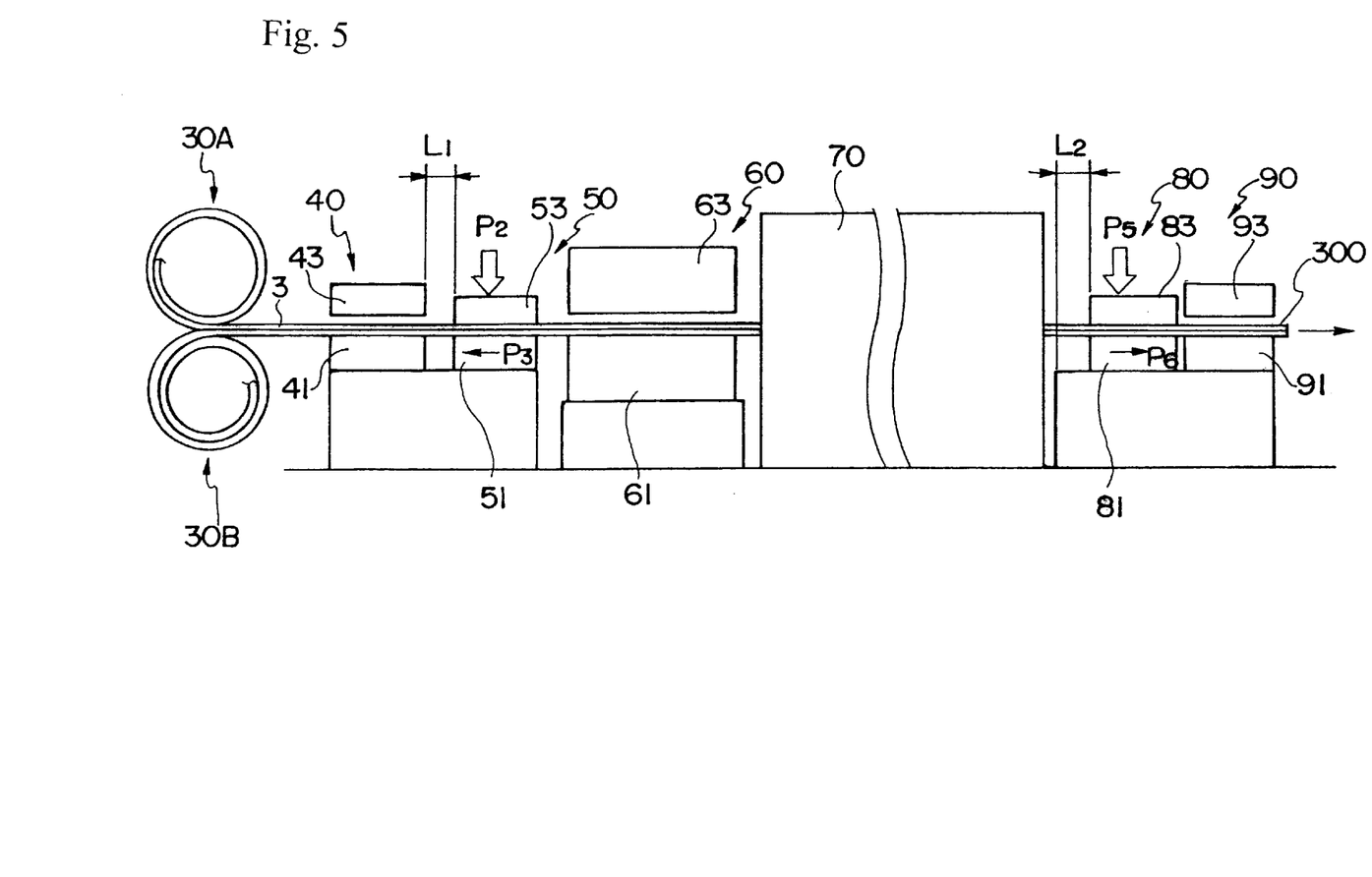
FIG. 5 is an explanatory view showing the state of operation.

Depressurizing step (state shown in FIG. 5)

At time $T_1$, the pressurization by the pressurizer 63 of the heating/pressurizing device 60 is released.

At time $T_2$, the pressurizer 43 of the fixing device 40 is released, and the pressurizer 93 of the fixing device 90 is released, thereby releasing the composite material 3. Then, the upstream sending device 50 and the downstream sending device 80 are started, which pinch the composite material 3 or compound material 300.

Moving step (refer to FIG. 5)

When the pressure from each pressurizers 43 and 93 of fixing devices 40 and 90 are released completely at time $T_3$, the first tension cylinder 57 (movement $P_3$) of the first sending device 50 is started. At the same time, the second tension cylinder 87 (movement $P_6$) is started. Since the relation between the moving forces of each cylinder is set as movement $P_3$<movement $P_6$, the power of the movement $P_6$ of the second tension cylinder 87 of the second sending device 80 is greater than the power of the movement $P_3$ of the first tension cylinder 57 trying to pull back the composite material 3 from moving downstream. Therefore, the upstream sending device 50 will not move while movement power $P_3$ is resisting, but when the movement could no longer be resisted, the first sending device 50 and the second sending device 80 move downstream while pinching the composite material 3 or compound material 300. When the movement of the upstream sending device 50 is expressed as movement length $L_1$, and the movement of the downstream sending device 80 is expressed as movement length $L_2$, the relation between the two lengths is shown as $L_1<L_2$.

At this time, the composite material 3 or the compound material 300 receives tension toward both upstream and downstream directions.

Figure 6:
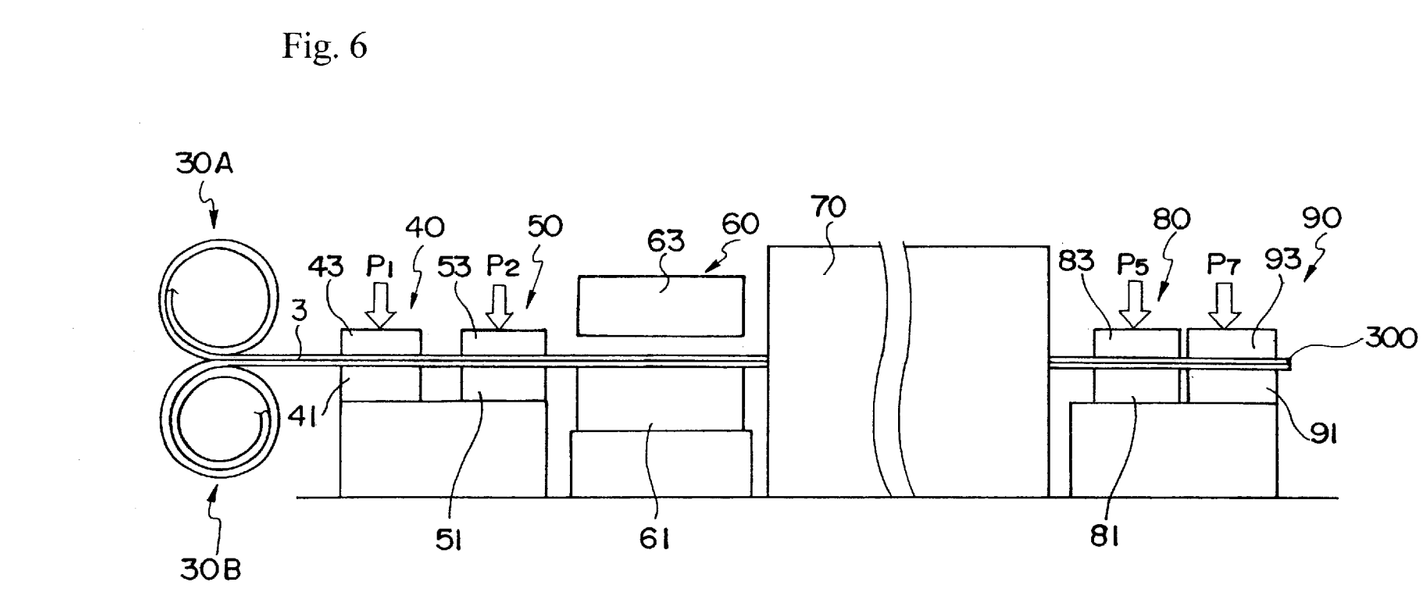
FIG. 6 is an explanatory view showing the state of operation.

Pinching step (refer to FIG. 6) When the movement is terminated at time $T_5$, the pressurizer 43 of the upstream fixing device 40 and the pressurizer 93 of the downstream fixing device 90 are started, and movement $P_1$ and movement $P_7$ are performed. Thereby, the composite material 3 or compound material 300 is pinched.

Figure 7:
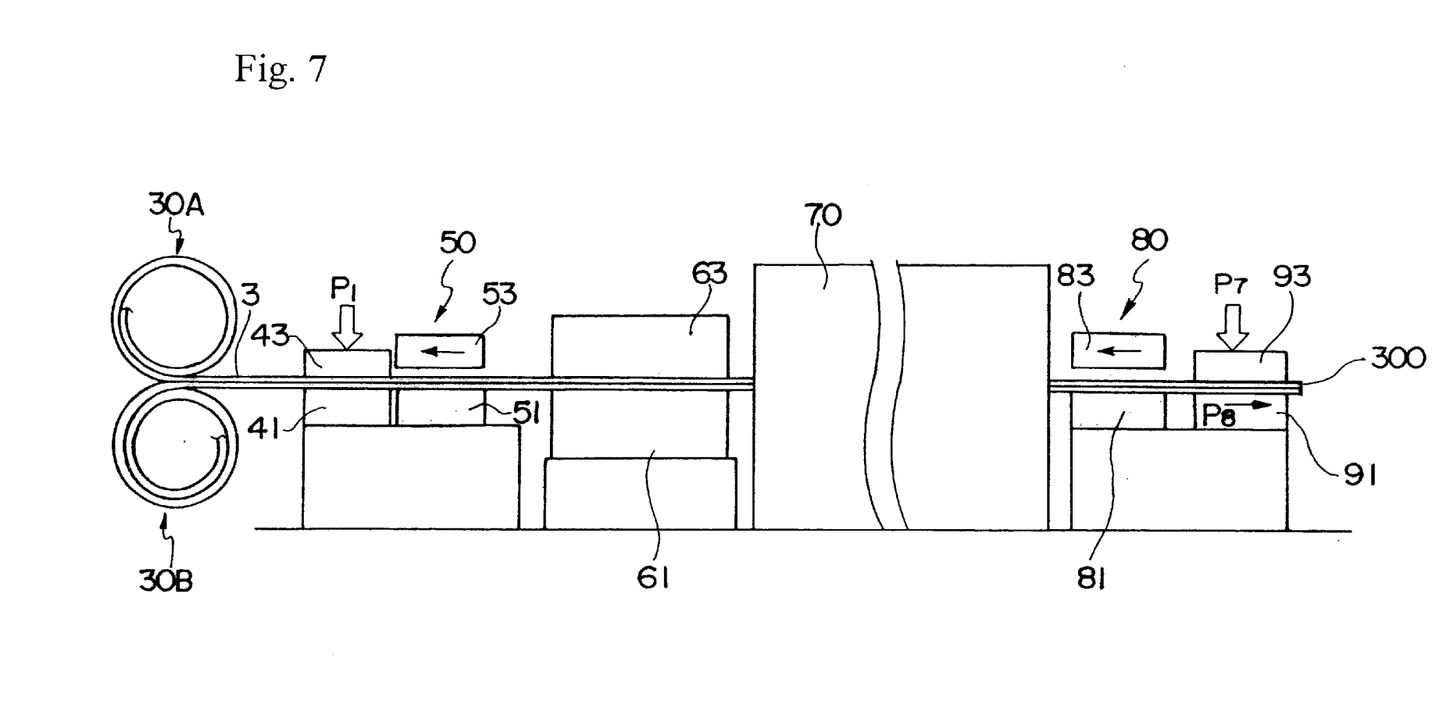
FIG. 7 is an explanatory view showing the state of operation.

Resetting step (refer to FIG. 7)

At time $T_6$, the pressurizer 53 of the upstream sending device 50 and the pressurizer 83 of the downstream sending device 80 are depressurized, and the pinching performed by the upstream sending device and the downstream sending device are released.

Further, at time $T_7$, the first tension cylinder 57 and the second tension cylinder 87 are stopped, and the third tension cylinder 97 is operated (movement $P_8$).

When hydraulic pressure is not provided to the first tension cylinder 57 and the second tension cylinder 87, the pressure of the press cylinder drops, and by the reset of the spring inside the cylinder, the upstream sending device 50 and the downstream sending device 80 return to their initial positions.

Simultaneously as the upstream sending device 50 and the downstream sending device 80 are returned to their initial positions, the third tension cylinder is started. Thereby, the third tension cylinder 97 pulls the compound material 300 downstream by a tension of movement $P_8$.

As explained, while the upstream sending device 50 and the downstream sending device 80 release the composite material 3, the upstream side of the composite material 3 is pinched and fixed by the upstream fixing device 40, and at the same time, the downstream side of the compound material 300 is pulled toward the advancing direction by the tension of movement $P_8$ by the downstream fixing device 90.

As explained above, the composite material 3 and the compound material 300 are provided with a pressurizing force or a tensile force during all steps including the heating/pressurizing step (from time $T_8$ to time $T_1$), the depressurizing step (from time $T_1$ to time $T_3$), the moving step (from time $T_3$ to time $T_5$), the pinching step (from time $T_5$ to time $T_7$), and the resetting step (from time $T_7$ to time $T_8$)

The provided tension is controlled by adjusting the tension cylinder pressures of the first tension cylinder 57, the second tension cylinder 87 and the third tension cylinder 97 according to the size, the cross-sectional area and the like of the composite material 3.

The compound material 300 formed as above provides preferred compression and tensile strength, with fibers 150 included as reinforcing material arranged in straight lines.

It is discovered through experiment that by providing approximately 500 kg of tension per 1 square cm of the cross-sectional area of the compound material, the straightness of the carbon fibers arranged within the compound material is improved, and the wavy deformation of the fibers is greatly reduced.

As explained, the method of forming the compound material according to the present invention applies providing tension to the fibers continuously throughout the whole forming steps of the method including the pressurizing cycle, the moving cycle, the depressurizing cycle and the like, while the forming step is proceeding intermittently. In other words, the forming device is formed to include a third tension structure (means) for providing tension to the pressurizing cycle and a first and a second tension structure (means) for providing tension to the moving cycle, so that the structures cooperate to provide tension to the fibers throughout the pressurizing cycle and the moving cycle.

The resin heated and pressurized as above will be melted, cured, and cooled. By providing tension to the fibers consistently, the straightness of the fibers is improved, and t the buckling of the fibers accompanying the thermal contraction is prevented. Thereby, a compound material which satisfies a preferable strength is formed.

The method and device for forming the compound material according to the present invention provides tension to the fibers in the material continuously during all continuous forming steps, so that the fibers inside the formed material are straightened linearly. As a result, the compound material manufactured according to the present invention provides high buckle strength when receiving compression load, has a load/strain curve having straightness, and provides a high tensile strength when receiving tensile load, without any stress concentrating on one portion of the fibers.

We claim:

1. A method for forming a compound material, said method comprising:

a pinching step of pinching and fixing the upstream end and the downstream end of a composite material reinforced with continuous fibers having waviness;

a heating/pressurizing step of heating and pressurizing the pinched and fixed composite material intermittently; and a moving step of releasing the compound material and sending said material to the downstream direction after termination of the heating/pressurizing step;

wherein during said pinching step, a tension toward the downstream advancing direction is provided to the downstream end of said composite material, and during said moving step, the amount of movement of said compound material at the downstream side is set to be greater than the amount of movement of said compound material at the upstream side, thereby straightening said fibers in the compound material linearly to reduce said waviness in said fibers.

2. A method for forming a compound material according to claim 1, wherein the tension toward the downstream advancing direction provided to the downstream end of the material is added from before the starting of said heating/pressurizing step to after the termination of said heating/pressurizing step.

3. A method for forming a compound material according to claim 1, wherein during said moving step, a tension toward the upstream direction is provided to the upstream side of said compound material.

* * * * *